US012554654B2

(12) United States Patent
Masters (10) Patent No.: US 12,554,654 B2
(45) Date of Patent: Feb. 17, 2026

(54) SELECTIVE MEMORY DUPLICATION CONTROL (71) Applicant: Google LLC, Mountain View, CA (US)

(72) Inventor: Jonathan Charles Masters, Boston, MA (US)

(73) Assignee: Google LLC, Mountain View, CA (US)

( * ) Notice: Subject to any disclaimer, the term of this patent is extended or adjusted under 35 U.S.C. 154(b) by 272 days.

(21) Appl. No.: 18/145,332

(22) Filed: Dec. 22, 2022

(65) Prior Publication Data
US 2024/0211412 A1 Jun. 27, 2024

(51) Int. Cl.
G06F 12/14 (2006.01)
G06F 11/14 (2006.01)

(52) U.S. Cl.
CPC ...... *G06F 12/1408* (2013.01); *G06F 11/1435* (2013.01); *G06F 12/1441* (2013.01)

(58) Field of Classification Search
CPC .. G06F 12/14; G06F 12/1408; G06F 12/0441; G06F 11/1435
See application file for complete search history.

(56) References Cited

U.S. PATENT DOCUMENTS

| 9,218,133 | B2 | 12/2015 | Starr |
| 9,679,646 | B2 | 6/2017 | Ishitobi et al. |
| 9,734,169 | B2 | 8/2017 | Redlich et al. |
| 9,904,603 | B2 | 2/2018 | Mutalik et al. |
| 10,521,230 | B2 | 12/2019 | DeHon |
| 10,789,003 | B1 | 9/2020 | Sun et al. |
| 10,846,199 | B2 | 11/2020 | Mola et al. |
| 11,188,639 | B2 | 11/2021 | LeMay et al. |
| 2011/0153944 | A1* | 6/2011 | Kursawe ................ G06F 21/78 711/143 |
| 2011/0173676 | A1* | 7/2011 | Peckover ............... H04L 63/08 726/3 |
| 2014/0006355 | A1 | 1/2014 | Kirihata |
| 2019/0138411 | A1* | 5/2019 | Lesartre ................ G06F 3/0619 |
| 2019/0272159 | A1* | 9/2019 | Pizlo ...................... G06F 8/434 |
| 2020/0125770 | A1 | 4/2020 | LeMay et al. |
| 2021/0149825 | A1* | 5/2021 | Durham ................ G06F 9/5016 |

(Continued)

FOREIGN PATENT DOCUMENTS

| CN | 115391235 A | 11/2022 |
| WO | 2017136090 A1 | 8/2017 |

(Continued)

OTHER PUBLICATIONS

T. Palit, J. Firose Moon, F. Monrose and M. Polychronakis, "DynPTA: Combining Static and Dynamic Analysis for Practical Selective Data Protection," 2021 IEEE Symposium on Security and Privacy (SP), San Francisco, CA, USA, 2021, pp. 1919-1937.*

(Continued)

*Primary Examiner* — Pierre Michel Bataille
(74) *Attorney, Agent, or Firm* — Lerner David LLP (57) ABSTRACT Generally disclosed herein is an approach for securing data. The approach may include encountering a pointer to a first memory location and determining, based on the pointer, that the first memory location is storing sensitive data. The approach may further include automatically copying the sensitive data to a secure memory location in response to determining that the first memory location is storing sensitive data.

18 Claims, 6 Drawing Sheets (56) References Cited

U.S. PATENT DOCUMENTS

2022/0121447 A1* 4/2022 Basak ................. G06F 9/30043
2023/0412648 A1* 12/2023 Noon .................... G06F 21/606

FOREIGN PATENT DOCUMENTS

WO    WO-2019012288 A1 * 1/2019 ............. H04L 63/10
WO    WO-2019172987 A1 * 9/2019 ......... G06F 12/0292

OTHER PUBLICATIONS

W. Shi, J. B. Fryman, G. Gu, H. . -H. S. Lee, Y. Zhang and J. Yang, "InfoShield: a security architecture for protecting information usage in memory," The Twelfth International Symposium on High-Performance Computer Architecture, 2006., Austin, TX, 2006, pp. 222-231.*
L. Semeria and G. De Micheli, "Resolution, optimization, and encoding of pointer variables for the behavioral synthesis from C," in IEEE Transactions on Computer-Aided Design of Integrated Circuits and Systems, vol. 20, No. 2, pp. 213-233, Feb. 2001.*
M. T. I. Ziad, M. A. Arroyo, E. Manzhosov, V. P. Kemerlis and S. Sethumadhavan, "EPI: Efficient Pointer Integrity For Securing Embedded Systems," 2021 International Symposium on Secure and Private Execution Environment Design (SEED), Washington, DC, USA, 2021, pp. 163-175.*
J. Roney, T. Appel, P. Pinisetti and J. Mickens, "Identifying Valuable Pointers in Heap Data," 2021 IEEE Security and Privacy Workshops (SPW), San Francisco, CA, USA, 2021, pp. 373-382.*
Exnteded European Search Report for European Patent Application No. 23174789.0 dated Oct. 17, 2023. 9 pages.

* cited by examiner

SELECTIVE MEMORY DUPLICATION CONTROL

BACKGROUND

Security of data stored in memory can be compromised using, for example, row hammer-style attacks. Row hammer-style attacks rely on corrupting or hammering adjacent rows in contemporary dynamic random access memory (DRAM). Such an attack may cause bit flips that can lead to both functionality loss as well as security compromise. For example, because in DRAM memory cells electrically interact between themselves by leaking their charges, row hammer-style attacks can rapidly and repeatedly read data in one memory row to cause an electrical charge in adjacent memory rows to corrupt data.

Memories such as DRAM contain a package of memory cells packed together. The memory cells are separately and electrically implemented with one capacitor and one transistor. Memory cells may be further organized into matrices and addressed by rows and columns in a table-like structure. Each memory address can be broken into a row address and a column address. When a row address is selected to execute a read operation, the cell charges are transferred into the row buffer. While the cell charges are being transferred into the row buffer, memory cells need to be rewritten. Additionally, since DRAM memory stores data bits using capacitors with a natural discharge rate, the memory cells may lose their state over time and require periodic rewriting of all memory cells.

Row hammer attacks repeatedly access a DRAM row and consequently cause bit flips in a physically nearby row when each memory cell discharges energy through a capacitor. The modern memory chips are more vulnerable to row hammer-style attacks as the memory cell size and cell-to-cell spacing reduces, and the distance between rows reduces such that more rows of memory cells may be impacted by the same discharge.

Available mitigation for security threats such as row hammer attacks usually leverages increasing the refresh rate of a memory controller. Increasing the refresh rate of the memory controller may cause additional consumption of energy and it may not fully protect data from a security compromise.

Error correction code (ECC) protection may detect and correct n-bit data corruption that occurs in memory. If one of the bits in the memory is corrupt, ECC's parity code may correct it and report the correct data back to the host computer. While ECC capabilities in memory may be useful to slow down row hammer attacks, it may not completely prevent row hammer attacks from causing bit flip especially when the attack's hammering speed exceeds the speed at which ECC may correct a bit flip at a given time. Among existing solutions, there are Target Row Refresh (TRR) mechanisms. In general, the TRR mechanism tries to refresh the victim row once a row hammer attack is detected.

BRIEF SUMMARY

The present disclosure provides for protecting data from attacks using a seamless detection and protection mechanism built into a computing microarchitecture. In particular, memory addresses may be tagged with indicators identifying whether data stored in a location corresponding to the memory address includes secure or sensitive data. If the memory address tag indicates sensitive data is stored at the location, the sensitive data may be automatically copied to a second memory location. If the data in the original memory location becomes corrupted, it may be replaced using the copy stored at the second memory location. In this regard, sensitive data may be protected and preserved.

An aspect of the disclosure provides a method for securing data. The method includes receiving, by one or more processors, a pointer to a first memory location. The method also includes determining, by the one or more processors based on the pointer, that the first memory location is storing sensitive data. The method further includes copying, by one or more processors in response to determining that the first memory location is storing sensitive data, the sensitive data. The method also includes storing a copy of the sensitive data to at least one second memory location.

In an example, the sensitive data comprises security keys or permission access keys.

In yet another example, the pointer comprises a plurality of bits, wherein a first subset of the plurality of bits identifies an address of the first memory location and a second subset of the plurality of bits indicate that the first memory location is storing sensitive data.

In yet another example, tagging memory comprises storing instructions pertaining to microarchitectural behaviors.

In yet another example, at least one second memory location is in L1 or L2 cache.

In yet another example, the method further includes comprising generating a pointer including a tag for the sensitive data at a time of hardware programming.

In yet another example, the generated tag includes instructions for a controller to take one or more actions.

In yet another example, the second memory location is in a memory region that is physically independent from the first memory location.

In yet another example, the second memory location is carved out from an existing cache structure.

In yet another example, the method further includes accessing the sensitive data at the first memory location, determining that the sensitive data at the first memory location is missing or corrupted, and initiating a corrective action when the sensitive data at the first memory location is missing or corrupted.

In yet another example, initiating the corrective action comprises loading the copy of the sensitive data from the second memory location.

In yet another example, initiating the corrective action comprises triggering a control unit of the CPU to take the corrective action.

In yet another example, the corrective action comprises replacing contents of the first memory location with the copy of the sensitive data from the second memory location.

In yet another example, the method further includes determining whether the sensitive data is stored in L1 cache and when the sensitive data is stored in L1 cache, taking no further action.

Another aspect of the disclosure provides a system for securing data, the system comprising one or more memories and one or more processors configured to: receive a pointer to a first memory location; determine based on the pointer, that the first memory location is storing sensitive data; copy in response to determining that the first memory location is storing sensitive data, the sensitive data; and store a copy of the sensitive data to at least one second memory location.

In yet another example, the one or more processors are further configured to: access the sensitive data at the first memory location; determine that the sensitive data at the first memory location is missing or corrupted; and initiate a corrective action when the sensitive data at the first memory location is missing or corrupted.

In yet another example, the one or more processors are further configured to initiating the corrective action further comprising loading the copy of the sensitive data from the second memory location.

In yet another example, the one or more processors are further configured to initiating the corrective action further comprising triggering a control unit of the CPU to take the corrective action.

In yet another example, the one or more processors are further configured to replace contents of the first memory location with the copy of the sensitive data from the second memory location.

DETAILED DESCRIPTION

Generally disclosed herein is an approach for securing sensitive data using in-band memory tags associated with memory locations. Such memory tags may contain a sub-set of tags that may identify memory locations particularly directed to sensitive data. For example, upon detection of a tag indicating that data in the memory location is sensitive, a memory controller or other computing unit may execute instructions that may cause it to copy the sensitive data to a more privileged storage location such as L1 cache. L1 cache is a memory bank built into the CPU chip. L1 cache is often the fastest memory in a computing device and closest to the processor.

The approach may also include changing the processor's microarchitectural behavior by creating redundant copies of the sensitive data using additional L1 cache or less secure DDR memory or causing a memory controller to use carved-out physical memory not otherwise available to the Operating System to store one or more redundant copies of the sensitive data that may be periodically compared. Background hardware that is capable of performing data scrubbing may be utilized to perform the above comparisons and cause corrupted sensitive data to be distinguished such that when the corrupted sensitive data is used by software next time, the background hardware may trigger an error. The background hardware may correct the error by automatically restoring the correct sensitive data. In some other examples, potentially corrupted sensitive data may be detected at the read/write time of the sensitive data by performing multiple read/write and comparing the one or more copies of the sensitive data from different locations.

The present disclosure provides a method for mitigating the above described security threats more effectively without changing the software's performance path. Such software may include any software that may manage encryption keys used for user credential and secure network sessions, or any type of communication including web traffic that uses encryption and requires a key, sensitive data such as user passwords, or Digital Rights Management (DRM) keys used to protect content. According to some examples, memory is tagged with information causing the processors' microarchitecture to protect sensitive data. In one example, sensitive data referred to herein may be data containing security keys or access/permit bits that enable accessing privileged information in memory. The present disclosure may selectively protect the very small sizes of data with high value.

According to some examples, the present disclosure may utilize memory tagging architecture to leverage unused bits of memory addresses with a pointer to a location where sensitive data is stored or instructions that cause the processors to change their microarchitectural behavior. For example, an application may use a long memory address, such as 32-, 64-, or 128-bit memory addresses, but not all of the bits are needed or used. Unused bits may be masked with zeros, and may be located at an end, beginning, or middle of the memory address. When hardware loads the data in the memory address, it may disregard the unused bits masked with zeros. According to the present disclosure, the unused bits may be used as tags to store extra information. Loading of data referred to herein may include reading or writing data.

According to one example, each tag may use 4 bits. In a 64-bit memory address, there may be 16 tags to contain certain attributes or information. If 16 bits are unused, the application may utilize 4 tags to store additional information without modifying the software/hardware's original performance path. The tags in the other unused bits may be used to cause the processor to take specific actions with respect to data stored at the memory location identified by the memory address. For example, the memory tags may cause the processor to copy the data from the memory location and store the copy of the data in a different memory location. In other examples, the tag may cause the processor to protect the data more directly by storing the data in the L1 cache, for example, by changing kernel functions, etc., or storing the sensitive data in a processor register.

According to some examples, the memory tags may be used to identify that the data stored at the corresponding memory location is sensitive data, such as cryptographic keys or the like. When the processor is called to load the sensitive data from the memory location, the processor may first check its local L1 cache. If the sensitive data from the identified memory location is already stored in the L1 cache, the processor may determine that the sensitive data is already in a secure location. However, in the case of cache miss, such as when the processor does not find the sensitive data stored in the L1 cache, the processor may find the location where the sensitive data is stored and load the sensitive data. The processor may also load a second copy of the sensitive data stored in an independent location, such that the processor may compare the sensitive data with the copy of the sensitive data. In this regard, data that is stored in locations other than L1 cache, which may be less trusted, may be verified by comparison of the first and second copies . . . . Loading the copy of the sensitive data from the independent location may take longer than loading the sensitive According to some examples, the present disclosure provides for a memory controller or other processor that may duplicate sensitive data in different ways. In one instance, the processor may duplicate an entire block of memory, including entire columns and rows, when a single cell of the memory is determined to contain the sensitive data. In other examples, the processor may carve out a small portion of the memory, such as a single cell or a subset of the memory surrounding the single cell, and copy the small portion. Any memory space in a computing device may be carved out and reserved for a copy of the sensitive data.

The processor may compare the original data with the duplicated data to determine whether any data has been modified or corrupted. The processor may compare the original data with the duplicated data whenever the sensitive data is not currently stored in a trusted location. When the sensitive data is loaded into L1 cache, the sensitive data may be loaded from multiple memory locations, such as carved-out physical memory locations that are not normally available to the Operating System. The sensitive data loaded from the multiple memory locations may then be compared. Upon comparison, when the sensitive data is found to be evicted from cache such as L1 cache to less secure memory locations, the sensitive data may be written back to multiple copies in multiple memory locations. The processor may compare the original data with the two or more copies of the data in the secondary memory locations. The processor may store more than one copy of the sensitive data in more than one memory locations to enhance the security of the sensitive data. The processor may determine with confidence that the original data is not corrupt or modified if the original data is the same as the copied data in at least one or more of the secondary memory locations. When the processor determines that the original data is corrupt, the processor may flag a signal and instruct a privileged software to modify the microarchitecture, such that the copied data replaces the original data. In some instances, the processor may zero the entire memory when a discrepancy is found. For example, an option to zero the entire memory may be presented to a user in response to detection of a discrepancy, or detection of a discrepancy of a threshold degree. If the user elects to zero the entire memory, the machine will no longer be used but any sensitive data is saved from being leaked to malicious actors.

According to some examples the processor may have duplicated the data from the original memory location to two or more secondary memory locations in memory structures that are physically independent from the original memory location. For example, the processor may store different copies in L1, L2 or L3 cache, such as by storing a first copy in L1 cache and storing a second copy in L2 cache, or storing a first copy in L1 cache and a second copy in L3 cache, etc. As L1, L2 and L3 cache may be embedded with ECC algorithms, storing multiple copies in multiple local caches may enhance the effectiveness of the ECC algorithms According to some examples, the processor may build a mechanism in a System Level Cache (SLC) by adding logic to an interface of a memory controller. The memory controller may manage the flow of data going to and from the computer's main memory such as DRAM. SLC may refer to a type of cache, similar to L3 cache that may be a larger cache than L1 cache located near the memory controller. As this is performed by adding logic to the memory controller, it may be performed without modifying a physical structure of the memory controller.

According to some examples, when sensitive data is being accessed, the processor may be instructed to halt speculative execution. Speculative execution may include arranging the instructions for optimal execution based on prediction as to which instructions will most likely be needed in the near future instead of executing the instructions in the order the instructions came in. Speculative execution may be vulnerable to certain cyber-attacks. Speculative execution attacks may work by tricking the processor into executing an instruction that accesses sensitive data in memory which is not permissible for low-privileged applications. In one example, the processor may load the sensitive data with special instructions tagged in a memory address and halt the speculative execution while accessing the sensitive data. When the processor finishes accessing the sensitive data, the processor may resume the speculation execution.

In some other examples, a special hardened memory or a static random-access memory (SRAM) on a chip may be used to simulate a processor cache specifically for certain sensitive data such as security keys, such that when the sensitive data is loaded, the sensitive data may be automatically copied and stored in the special hardened memory locations. Even if the original sensitive data is stored in a secure location like L1 cache, a copy of the sensitive data may be stored in a second secure location.

Figure 1:
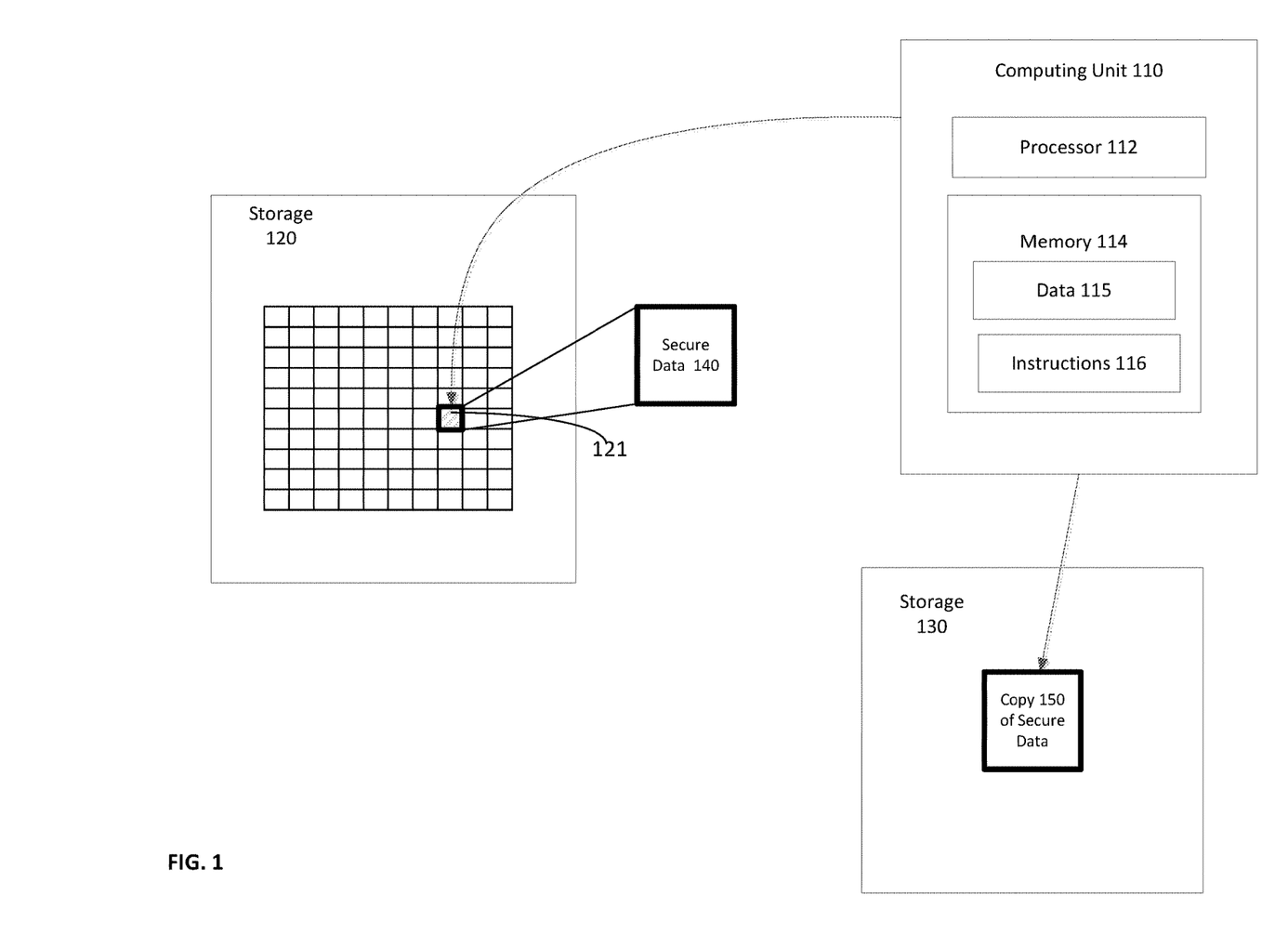
FIG. 1 depicts an example duplication of sensitive data according to aspects of the disclosure.

FIG. 1 depicts an example duplication of sensitive data. Computing unit 110 accesses storage 120. Computing unit 110 may include a server computer that may for example serve content for websites or hosting cloud computing virtual machines for customers or internal workloads. Storage 120 may contain memory cells packed together in a tabular form. For example, storage 120 may be DRAM or any memory architecture susceptible to bit flips exploitable by a malicious attacker. Storage 120 may include flash memory with certain flash cells that may wear out faster than other flash cells. Each memory cell may be identified by a memory address. For example, the memory address may be multi-bit value. Each memory cell may contain data. For example, memory cell 121 may contain secure data 140. The data in any given memory cell, such as memory cell 121, may be identified based on a tag embedded in the memory address. For example, the tag may identify that the data is sensitive or secure data. When computing unit 110 receives an instruction to access a memory address corresponding to memory cell 121, the computing unit 110 may identify that the memory address includes a tag indicating that the data 140 stored in the memory cell 121 includes secure or sensitive data. Upon detection of such tag, the computing unit 110 copy the secure data 140 and to store a copy 150 of secure data in a second storage 130. For example, the second storage may be an independent storage architecture. The second storage 130 may be a same type of storage as the storage 120, such as a DRAM. In other examples, the second storage may be a different type of storage, such as cache. According to some examples, the second storage 130 may be L1 cache in the computing unit. While the second storage 130 is shown as an independent architecture from the first storage 120 and the computing unit 110, any combination of the first storage 120, second storage 130, or computing unit 110 may reside in the same physical housing.

The computing unit 110 may contain a processor 112, memory 114, and other components typically present in server computing devices. The memory 114 can store information accessible by the processor 112, including instructions 116 that can be executed by the processor 112. Memory can also include data 115 that can be retrieved, manipulated or stored by the processor 112. The memory 114 may be a type of non-transitory computer readable medium capable of storing information accessible by the processor 112, such as a hard-drive, solid state drive, tape drive, optical storage, memory card, ROM, RAM, DVD, CD-ROM, write-capable, and read-only memories. The processor 112 can be a well-known processor or other lesser-known types of processors. Alternatively, the processor 112 can be a dedicated controller such as an ASIC.

The instructions 116 can be a set of instructions executed directly, such as machine code, or indirectly, such as scripts, by the processor 112. In this regard, the terms "instructions," "steps" and "programs" can be used interchangeably herein. The instructions 116 can be stored in object code format for direct processing by the processor 112, or other types of computer language including scripts or collections of independent source code modules that are interpreted on demand or compiled in advance.

The data 115 can be retrieved, stored or modified by the processor 112 in accordance with the instructions 116. For instance, although the system and method is not limited by a particular data structure, the data 115 can be stored in computer registers, in a relational database as a table having a plurality of different fields and records, or XML documents. The data 115 can also be formatted in a computer-readable format such as, but not limited to, binary values, ASCII or Unicode. Moreover, the data 115 can include information sufficient to identify relevant information, such as numbers, descriptive text, proprietary codes, pointers, references to data stored in other memories, including other network locations, or information that is used by a function to calculate relevant data.

Although FIG. 1 functionally illustrates the processor 112 and memory 114 as being within the same block, the processor 112 and memory 114 may actually include multiple processors and memories that may or may not be stored within the same physical housing. For example, some of the instructions 116 and data 115 can be stored on a removable CD-ROM and others within a read-only computer chip. Some or all of the instructions and data can be stored in a location physically remote from, yet still accessible by, the processor 112. Similarly, the processor 112 can actually include a collection of processors, which may or may not operate in parallel.

Figure 2:
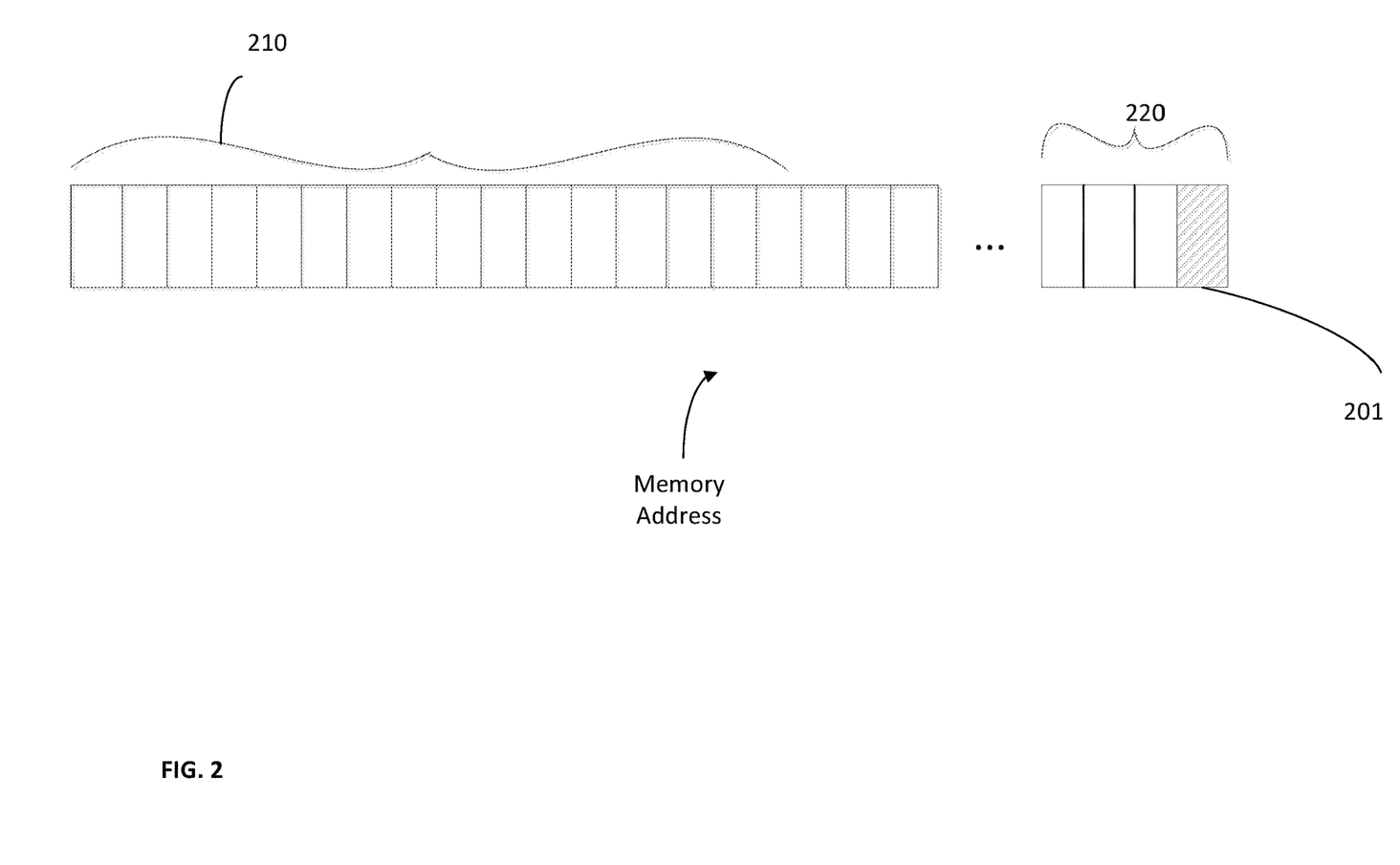
FIG. 2 depicts an example memory tagging technique according to aspects of the disclosure.

FIG. 2 depicts an example memory address including a pointer or tag identifying a type of data stored at the memory address. For example, the tag may identify whether the data in the storage location corresponding to the memory address is sensitive or secure data.

As shown in FIG. 2, the memory address includes a plurality of bits. By way of example, the memory address may include 16, 32, 64, 128, or more bits. A first subset 210 of the bits may be used to identify the memory location. While the first subset 210 is shown as including a particular number of bits, the number of bits in the first subset 210 may be modified based on, for example, the type of memory, the size of memory, or any of a variety of other factors. The first subset 210 may include less bits than a total number of bits in the memory address structure. As such, a second set of bits 220 may be used to indicate information other than the memory location. For example, the second set of bits 220 may be used as a tag to identify the type of data stored in the memory location. For example, the second subset 220 may be 2, 4, 8, or any other number of bits, depending on a size of the memory address and number of otherwise unused bits. According to another example, a third subset of bits may include additional tagging information, such as to identify how data stored in the memory location should be handled by the memory controller, whether the data in the memory location has already been copied, where it has been copied, etc.

The bits of the memory address including one or more tags may be positioned anywhere in the memory address. For example, the tagged bits can be positioned at a beginning segment of the memory address, end segment, middle segment, etc.

The tag may be inserted using memory management code functions by the Operating System. When programmers use the above memory management functions, the Operating System may provide an additional attribute indicating that the particular memory location requested has sensitive data. A back end programmer may need to add a simple augmentation to the above memory location using, for example, "malloc" function to indicate that the memory location will contain the sensitive data. Secure or sensitive data may be pre-identified by the programmer or identified using technologies such as keyword detection or matching metadata detection. In some examples, certain software may use special cryptographic functions to manage keys, and such cryptographic functions may change memory allocations automatically.

Figure 3:
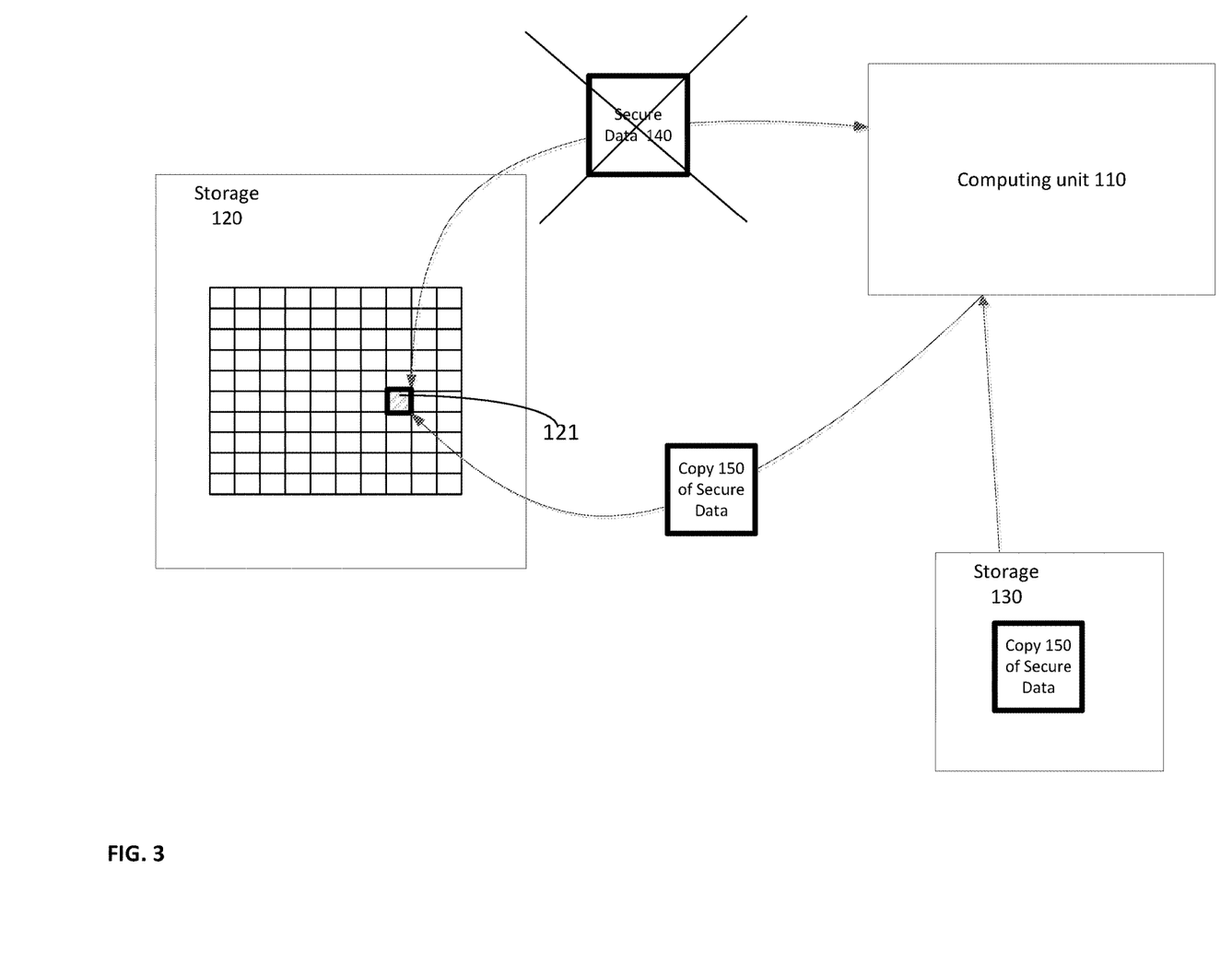
FIG. 3 depicts an example corrective action in response to missing or corrupt data according to aspects of the disclosure.

FIG. 3 illustrates an example of detecting missing or corrupt data and taking corrective action in response. Computing unit 110 may receive an instruction requiring it to access data at a memory address corresponding to memory cell 121. Based on the memory address, as described above, the computing unit 110 may determine that the data that should be stored in the memory cell 121 is secure data 140. In accessing the secure data 140, however, the computing unit 110 may determine that the secure data 140 is missing from the memory cell 121 or that the secure data 140 is corrupt. By way of example, the computing unit 110 may compare the secure data 140 to the copy 150 of the secure data at the second storage 130. The computing unit 110 may know there is already a copy of the sensitive data in other locations by looking at the memory with a carved out region where duplicated data is stored. To the Operating System, the entire memory may appear as if there is only one large contiguous physical memory, but some of the carved-out regions may contain additional metadata such as address and data indicating the sensitive data is being duplicated within the carved-out region. If the accessed secure data 140 does not match the copy 150, the computing unit 110 may determine that the secure data 140 has been corrupted.

When it is determined that the secure data 140 is missing or corrupted, the computing unit 110 may take a corrective action. One example of such corrective action may be to utilize the copy 150 of the secure data in executing the instructions, instead of using the data from memory cell 121. Another example of such corrective action may be to replace the data in memory cell 121 with the copy 150 of the secure data.

In another example, the computing unit 110 may zero the entire memory of storage 120 to prevent the leakage of the secure data stored in memory cell 121.

Figure 4:
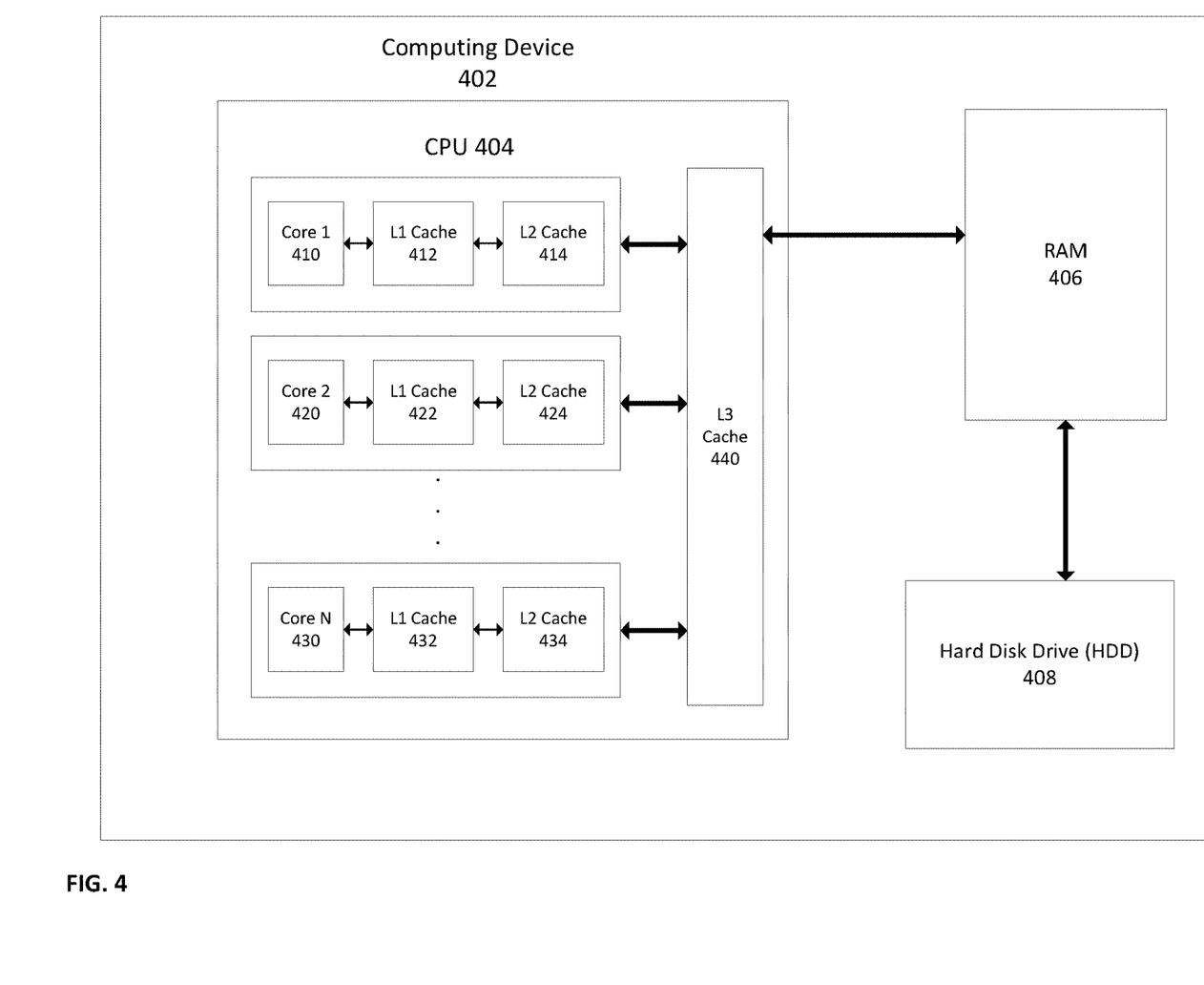
FIG. 4 depicts a block diagram of an example computer system architecture according to aspects of the disclosure.

FIG. 4 depicts a block diagram of an example computer system architecture. Computing device 402 may be a machine that accesses a memory address. Computing device 402 may include CPU 404, random access memory, RAM 406, and Hard Disk Drive (HDD) 408. CPU 404 may include one or more cores, such as cores 410, 420, and 430. Each core may read from or write to the L1 cache. Each core may read from or write to L3 cache 440. L3 cache 440 may read from or write to RAM 406 and RAM 406 may read from or write to HDD 408. For example, core 410 may retrieve data from L1 cache 412 or L2 cache 414. Core 420 may retrieve data from L1 cache 422 or L2 cache 424. Core 430 may retrieve data from L1 cache 432 or L2 cache 434.

In some examples, CPU 404 may access secure data stored in external storage, and duplicate the data and store the duplicated data in one or more of the L1 caches, L2 caches, or L3 caches, or other storage areas.

Figure 5:
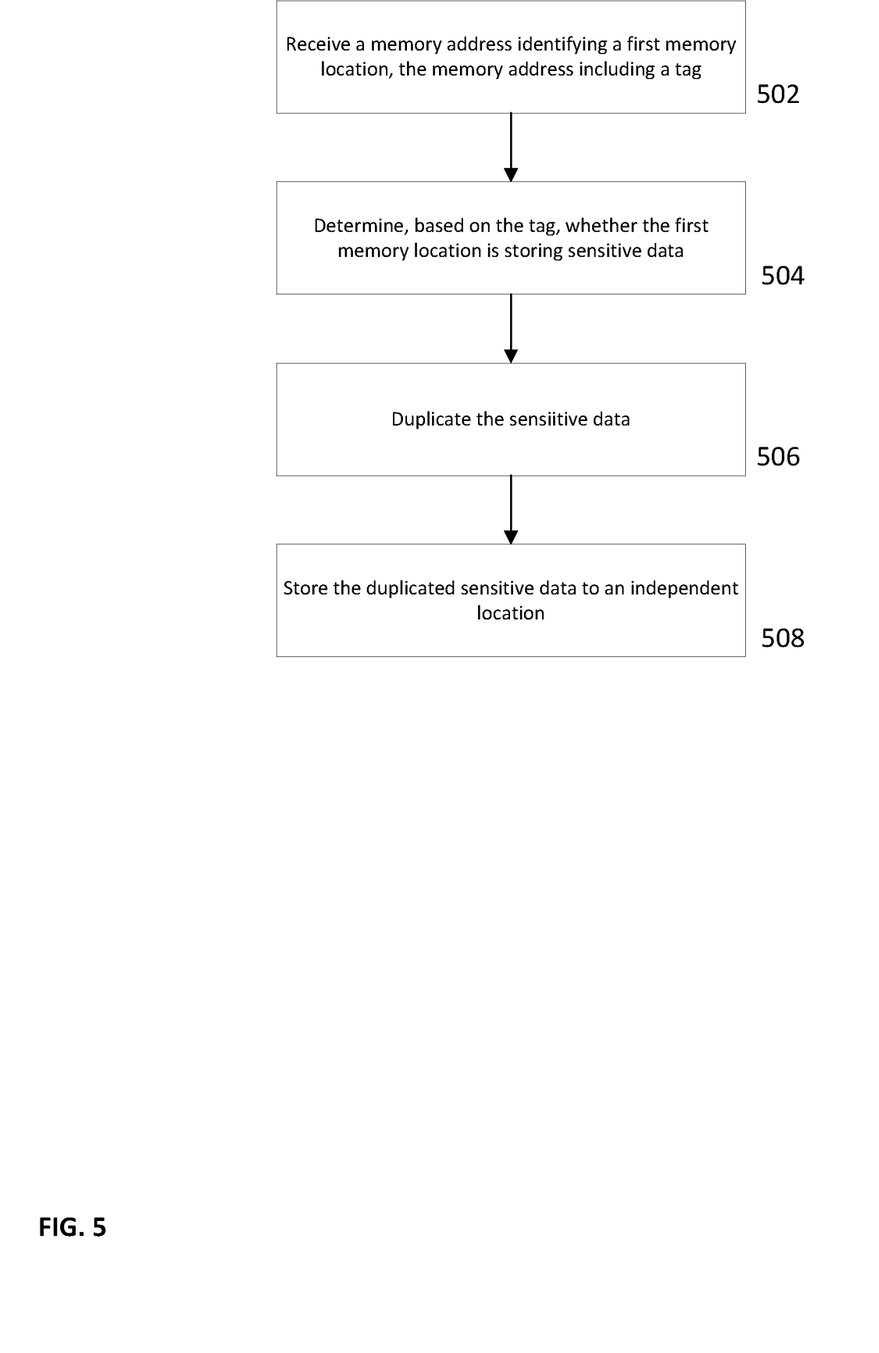
FIG. 5 depicts a flow diagram of an example method for securing data by tagging and duplicating memory according to aspects of the disclosure.

In some examples, if CPU 404 retrieves sensitive data from external storage or HDD 408 within the computing device 402, CPU 404 may read a tag with an instruction causing CPU 140 to compare the original data with any duplicated data stored in a different location. However, if the original data or duplicated data is stored in highly privileged locations such as L1 cache or L2 cache, CPU 404 may trust that such data is more likely uncorrupted FIG. 5 depicts a flow diagram of an example method for securing data by memory tagging. In block 502, the processor may receive an address for a first memory location, such as in executing an instruction that requires access or retrieval of data at the first memory location.

In block 504, the processor may determine whether the first memory location is storing sensitive data. When the processor reads the tag in the memory address, the processor may determine based on the tag that the data stored in the first memory location is sensitive data. For example, the processor may compare the tag to a table or other data structure stored in memory that correlates various tags with information, such as information identifying the type of data stored at the memory location. As another example, the processor may be programmed such that if a particular tag is detected, then the processor will identify the data stored in the memory address from which the tag was read as sensitive or secure data.

In block 506, the processor may duplicate the data at the memory location in response to determining that it is sensitive or secure data.

In block 508, the processor may store the duplicated data in an independent location. For example, the processor may store the duplicated sensitive data in a highly privileged location such as an L1 cache. In other examples, the processor may store the duplicated sensitive data in another external storage. The processor may determine where to store the duplicated data based on, for example, information in the tag, the type of data, programming instructions for the processor, etc. According to some examples, the processor may copy the sensitive data more than once and store multiple copies of the sensitive data. For example, a first copy may be stored in a first location, and a second copy may be stored in a second location different from the first location. Further additional copies may also be stored.

Figure 6:
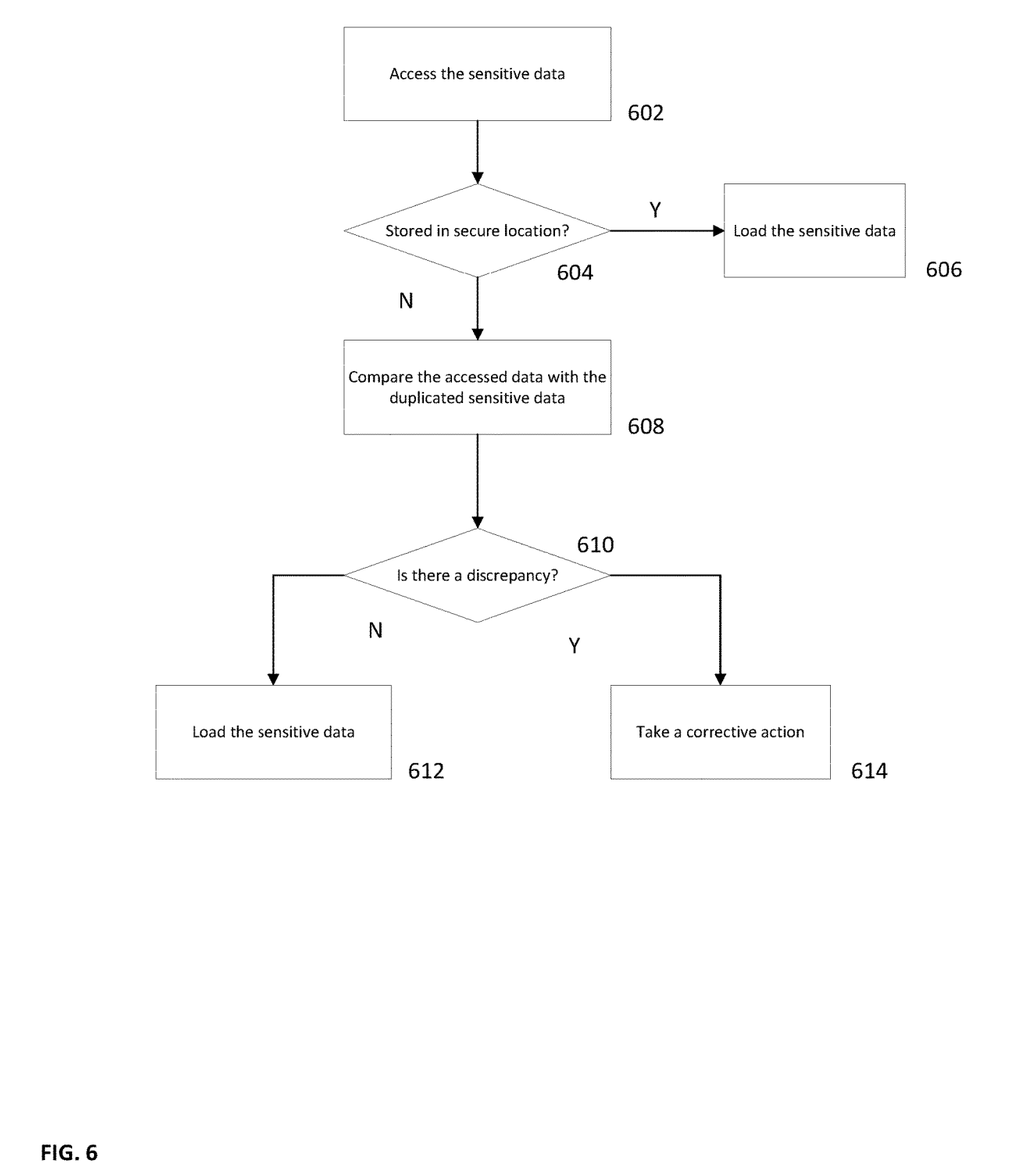
FIG. 6 depicts a flow diagram of an example method for taking corrective action based on the comparison of original sensitive data with duplicated data according to the aspects of the disclosure.

FIG. 6 depicts a flow diagram of an example method for taking corrective action if the sensitive data at the original memory location is missing or corrupt or other compromised.

According to block 602, the processor may access sensitive data. As described above, the processor may receive a memory address identifying a first memory location where the sensitive data is stored. Such memory address may include a tag identifying that data stored at the memory location is sensitive data. The processor may access the data, for example, to retrieve the data as part of an instruction stream or other command. For example, the sensitive data may include a cryptographic key, and the processor may be called to obtain the cryptographic key for an authentication procedure.

According to some examples, as shown in block 604, the processor may evaluate a level of safety of the memory location where the sensitive data is stored. For example, if the sensitive data is stored in an HDD, the processor may determine that the sensitive data is not stored in a very safe location. If the sensitive data is stored in L1 cache, for example, the processor may determine that it is stored in a secure location. If it is determined in block 604 that the secure data is stored in a secure location such as L1 cache, the processor may proceed to block 606 where it loads the sensitive or secure data. If the data is not stored in a secure location, the processor may proceed to block 608.

In block 608, the processor may compare the accessed data with previously duplicated data. For example, the processor may retrieve the duplicated sensitive data stored in a second memory and compare the accessed data with the duplicated data.

In block 610, the processor may determine whether there is a discrepancy between the accessed sensitive data at the original memory location and the duplicated sensitive data copied at the second memory. If there is a discrepancy, the processor may proceed to block 614. Discrepancies may include, for example, if there is a mismatch between the accessed data and the duplicated data, or if the accessed data is missing or unable to be properly accessed. If there is no discrepancy between the accessed and the duplicated data, the processor may proceed to block 612.

According to block 612, where there is no discrepancy in the comparison, the processor may load the accessed data from the first memory location. For example, the processor may use the data from the first memory location is executing instructions. In one example, the processor may store the information as to when the original data was accessed.

According to block 614, the processor may take corrective action when there is a discrepancy between the accessed sensitive data and the duplicated sensitive data. Corrective action may include replacing the accessed data at the first memory location with the duplicated sensitive data. Other corrective action may include wiping the first memory location, or an entire memory structure that includes the first memory location. In some examples, the memory address identifying the first memory location may be changed to indicate the address of the second location storing the duplicated data.

Although the technology herein has been described with reference to particular examples, it is to be understood that these examples are merely illustrative of the principles and applications of the present technology. It is therefore to be understood that numerous modifications may be made and that other arrangements may be devised without departing from the spirit and scope of the present technology as defined by the appended claims.

Unless otherwise stated, the foregoing alternative examples are not mutually exclusive but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method for securing data, comprising:
receiving, by one or more processors, a pointer to a first memory location, wherein the pointer comprises a plurality of bits, wherein a first subset of the plurality of bits identifies an address of the first memory location and a second subset of the plurality of bits indicates that the first memory location stores sensitive data;
determining, by the one or more processors based on the pointer, that the first memory location is storing sensitive data;
copying, by one or more processors, the sensitive data;
storing a copy of the sensitive data to at least one second memory location; and
generating the pointer including a tag for the sensitive data at a time of hardware programming.

2. The method of claim 1, wherein the sensitive data includes security keys or permission access keys.

3. The method of claim 1, further comprising storing instructions pertaining to microarchitectural behaviors.

4. The method of claim 1, wherein the at least one second memory location is in Li or L2 cache.

5. The method of claim 1, wherein the tag is associated with instructions for a controller to take one or more actions.

6. The method of claim 1, wherein the at least one second memory location is in a memory region that is physically independent from the first memory location.

7. The method of claim 1, wherein the at least one second memory location is carved out from an existing cache structure.

8. The method of claim 1, further comprising:
accessing the sensitive data at the first memory location;
determining that the sensitive data at the first memory location is missing or corrupted; and
initiating a corrective action when the sensitive data at the first memory location is missing or corrupted.

9. The method of claim 8, wherein initiating a corrective action comprises loading the copy of the sensitive data from the second memory location.

10. The method of claim 8, wherein the corrective action comprises replacing contents of the first memory location with the copy of the sensitive data from the second memory location.

11. The method of claim 1, further comprises:
determining whether the sensitive data is stored in L1 cache;
when the sensitive data is stored in L1 cache, determining that the sensitive data is stored in a secure location; and
in response to determining that the sensitive data is stored in a secure location, taking no further action with respect to copying the sensitive data.

12. A system for securing data, the system comprising:
one or more memories; and
one or more processors configured to:
receive a pointer to a first memory location, wherein the pointer comprises a plurality of bits, wherein a first subset of the plurality of bits identifies an address of the first memory location and a second subset of the plurality of bits indicates that the first memory location is storing sensitive data;
determine based on the pointer, that the first memory location is storing sensitive data;
copy the sensitive data;
store a copy of the sensitive data to at least one second memory location; and
generate the pointer including a tag for the sensitive data at a time of hardware programming.

13. The system of claim 12, wherein the one or more processors are further configured to:
access the sensitive data at the first memory location;
determine that the sensitive data at the first memory location is missing or corrupted; and
initiate a corrective action when the sensitive data at the first memory location is missing or corrupted.

14. The system of claim 13, wherein initiate a corrective action comprises loading the copy of the sensitive data from the second memory location.

15. The system of claim 13, wherein the corrective action comprises replacing contents of the first memory location with the copy of the sensitive data from the second memory location.

16. The system of claim 13, wherein the second memory location is in a memory region that is physically independent from the first memory location.

17. The system of 14, wherein the sensitive data comprises security keys or permission access keys.

18. The system of claim 12, wherein the second memory location is carved out from an existing cache structure.

* * * * *